(12) United States Patent
Leutner

(10) Patent No.: US 7,683,563 B2
(45) Date of Patent: Mar. 23, 2010

(54) PROTECTIVE DEVICE FOR A POWER-ASSISTED STEERING SYSTEM

(75) Inventor: Wilfried Leutner, Schwaebisch Gmuend (DE)

(73) Assignee: ZF Lenksysteme GmbH, Schwaebisch Gmend (DE)

(*) Notice: Subject to any disclaimer, the term of this patent is extended or adjusted under 35 U.S.C. 154(b) by 0 days.

(21) Appl. No.: 12/070,287

(22) Filed: Feb. 14, 2008

(65) Prior Publication Data

US 2008/0265818 A1 Oct. 30, 2008

(30) Foreign Application Priority Data

Apr. 24, 2007 (DE) .................. 10 2007 019 257

(51) Int. Cl.
*H02P 7/00* (2006.01)
(52) U.S. Cl. .................. 318/432; 318/433; 318/599
(58) Field of Classification Search .................. 318/432, 318/433, 599, 139, 465, 400.22, 400.26, 318/400.3, 400.36, 400.41; 361/23; 180/404
See application file for complete search history.

(56) References Cited

U.S. PATENT DOCUMENTS 3,602,788 A * 8/1971 Kawabe et al. .............. 318/780
6,617,811 B2 9/2003 Schaefert

FOREIGN PATENT DOCUMENTS

DE 100 13 133 9/2001
DE 10 2006 004 535 8/2007

* cited by examiner

*Primary Examiner*—Karen Masih
(74) *Attorney, Agent, or Firm*—Jordan and Hamburg LLP

(57) ABSTRACT

A protective device for a power-assisted steering system, such a power-assisted steering system, and a method for protecting a power-assisted steering system are described. Provided in the described power-assisted steering system is a circuit that closes a separation in the neutral point of an electric motor when the rotational speed of the electric motor exceeds a prespecified value.

23 Claims, 3 Drawing Sheets

PROTECTIVE DEVICE FOR A POWER-ASSISTED STEERING SYSTEM

BACKGROUND OF THE INVENTION

The invention relates to a protective device for a power-assisted steering system, such a power-assisted steering system, and a method for protecting a power-assisted steering system.

With power-assisted steering systems there can be problems when the wheels move at high speeds. Thus for instance in a vehicle workshop the steering is frequently moved by rotating the wheels of the motor vehicle while the power-assisted steering is turned off. When enough force is exerted, the steering can be accelerated such that a very high steering speed is attained. This is far greater than the steering speed that occurs during normal operation. The parts of the steering system that are operationally connected to the wheels thus obtain high rotational speeds.

If the steering system stops at the steering stop at a high steering speed, all components are sharply braked. Due to the great delay in the rack and the electric motor drivingly connected thereto there can be very high torques and forces on the transmission and electric motor. These torques and forces can be so great that the components are damaged.

The higher the speed with which the stop is reached, the higher the risk of damage. Although the high rotational speeds can be avoided during operation using suitable control of the motor in that active intervention is used to prevent high rotational speeds, this is not possible when it is turned off. When it is turned off damage is probable if no other measures are taken.

It should furthermore be kept in mind that in steering systems with electrical neutral point separation using field effect transistors and a synchronous motor, at a high rotational speed the motor can generate so much voltage that the field effect transistors of the neutral point go into avalanche mode. Then a majority of the energy added by the mechanic is converted to heat in the neutral point field effect transistors. This can lead to the field effect transistors being thermally destroyed.

A protective device for an electrical steering system is known from publication DE 100 13 133 A1. In it, the electric motor for the power-assisted steering system is connected to a brake circuit that applies an electrical load to the motor if the rotational speed exceeds a prespecified value.

It is disadvantageous in the protective device described in the publication that the protective device functions only with direct current motors. However, as a rule permanently excited synchronous motors are used in electric steering systems with greater power. For safety reasons it is provided that the neutral point is separated when turned off.

Completing the circuit of the output stage, as is suggested in the publication, does not have any effect in a relay separation because the separated neutral point does not provide any current and thus does not permit braking of the motor.

During normal operations this device must be turned off because otherwise the system does not function (for instance cut-out relay). This cut-out device can itself be faulty, which reduces the availability of the steering system.

It is therefore the object to suggest a protective device that can also be used with a synchronous motor with neutral point separation.

SUMMARY OF THE INVENTION

The inventive protective device for a power-assisted steering system of a motor vehicle, the power-assisted steering system having a control device, an electric motor with neutral point separation, and a transmission, includes a circuit that is connected to the electric motor and closes the neutral point separation when the rotational speed of the synchronous motor exceeds a prespecified value.

The motor is thus connected to the inventive protective device with a circuit that closes the neutral point separation when the rotational speed of the motor exceeds a prespecified value. Care can be taken that the prespecified rotational speed value is at least high enough that the driver can safely steer the vehicle even if the electronics are turned off, e.g. if there is a fault. In the embodiment, the rotational speed value is high enough that the driver can still turn the steering wheel at least 90°/s. This is particularly important when additional FETs of a power output stage are to be closed.

In the embodiment, a closed circuit is created for the voltage generated by the motor so that the neutral point is bridged. The circuit can be formed e.g. in that an electrical connection is created between at least one motor terminal and the neutral point.

If the motor voltage generated is smoothed, it can act as a reference signal for the rotational speed.

The generated voltage can be used directly for closing the field effect transistors.

Alternatively, the generated voltage, which can be smoothed, can be used for switching a second voltage, such as e.g. a battery voltage.

In the embodiment, phases of the synchronous motor have high ohmic connections to sides of the neutral point compared to the coils. This can occur by mutual connection using resistors upstream of the neutral point separation, mutual connection using resistors between phase and neutral point, connecting to the ground using resistors upstream of the neutral point separation, or connecting to the ground using a resistor in the neutral point. However, the use of additional resistors is not absolutely necessary due to the parasitic diodes or body diodes of the field effect transistors.

A power-assisted steering system with a synchronous motor that is provided to support steering torque, wherein a separation is to be made in the neutral point of the synchronous motor, is characterized in that a protective device, in particular a protective device of the type described in the foregoing, is provided that has a circuit that closes the separation when the rotational speed of the synchronous motor exceeds a prespecified value.

In the power-assisted steering system described, a protective device having the aforesaid features is employed in embodiments.

The inventive method protects a power-assisted steering system that includes a synchronous motor, wherein separation is to be made in the neutral point of the synchronous motor, and is characterized in that a circuit of a protective device, in particular a protective device of the type described in the foregoing, closes the separation when the rotational speed of the synchronous motor exceeds a prespecified value.

In the embodiment of the method, a generated motor voltage is smoothed on the sides of the power output stage. At least one phase is used. However, two phases or all phases can be used. The neutral point is closed when the smoothed voltage is at a specific, prespecifiable level of the smoothed voltage and represents a measure for the rotational speed or acts as a reference signal for the rotational speed. Normally the smoothed voltage is used directly for this, or the smoothed voltage is used in order to switch the vehicle voltage for closing the neutral point.

With the described method the motor is thus braked after or while closing the neutral point if the generated voltage is high enough that the voltage can drive current via the power output stage against the voltage applied there. This is the battery voltage when a battery is attached. Otherwise this is the voltage from the input capacitors, which is limited e.g. by a power zener diode between plus and ground. It should also be noted that during this procedure it is not necessary to actively turn off the protective circuit during normal operations.

In another embodiment of the inventive method, field effect transistors, in particular the so-called low-side field effect transistors, are also short-circuited. This functions regardless of whether the battery is attached or not. However, in normal operations this circuit must be turned off or interrupted. However, for reasons of safety this procedure should not be used unless a great deal of care has been taken.

Thus with the method there is effective protection for a power-assisted steering system with a synchronous motor. Therefore it is possible to prevent the field effect transistors from going into avalanche mode. So it is assured that the circuit used works passively and thus the microcontroller remains non-functioning. In the embodiment, the circuit is configured such that there is no need to turn it off during normal operations.

The invention makes it possible to limit the rotational speed of the motor to a specific prespecified value. This value should be low enough that no damage occurs when the final stop is reached and the field effect transistors in the neutral point separation do not first go into avalanche mode. On the other hand, the rotational speed must be high enough that if there is an error in the steering system the driver can still steer with sufficient steering speed, e.g. >90°/s.

Additional advantages and embodiments of the invention result from the description and the enclosed drawings.

It is understood that the aforesaid features and the features to be explained in the following can be used not only in the specified combination but also in other combinations or alone without departing from the framework of the present invention.

The invention is depicted schematically in the drawings using exemplary embodiments and is described in detail with reference to the drawings.

DETAILED DESCRIPTION OF THE INVENTION

Figure 1:
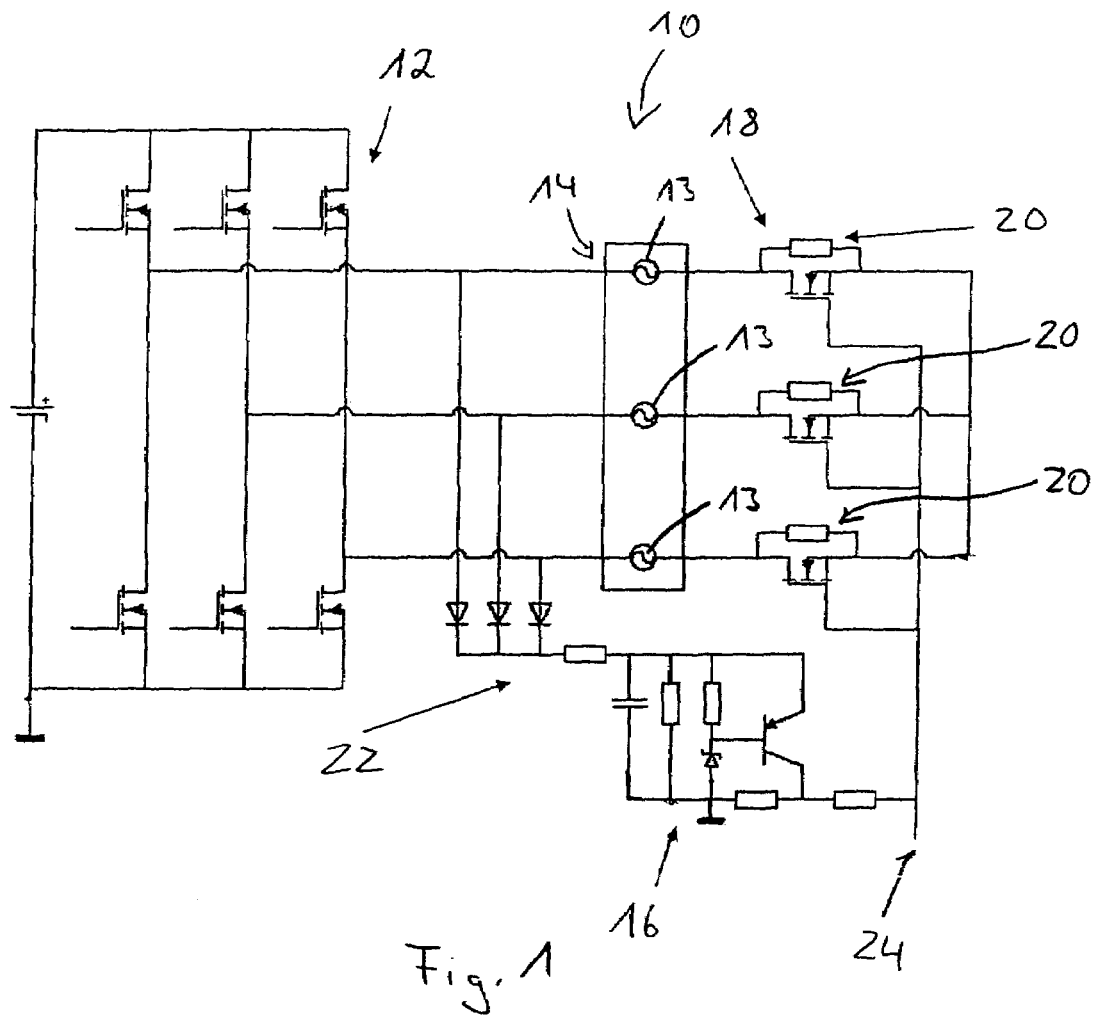
FIG. 1 is a circuit diagram of one embodiment of the inventive protective device.

FIG. 1 uses a circuit diagram to depict one embodiment of the inventive protective device, labeled 10 overall. A power output stage 12 that encompasses six field effect transistors, a synchronous motor 14 that is excited by permanent magnets and that is equipped with three phases 13, and a circuit 16 for closing a neutral point separation 18 that encompasses three field effect transistors can be seen.

Resistors 20 for a relatively high ohmic connection of the motor phases 13 of the synchronous motor 14 via the neutral point are provided for each of the field effect transistors of the neutral point separation 18.

Furthermore, three diodes 22 for rectifying and an RC unit for smoothing a generated motor voltage are provided on the side of the power output stage 12.

The circuit 16 closes the neutral point separation 18 as soon as the rotational speed of the synchronous motor 14 exceeds a certain value. In addition, the field effect transistors of the power output stage 12 close. The voltage generated by the synchronous motor results in the closed circuit.

The illustration furthermore depicts a terminal 24 with which during normal operation, in which the microprocessor works, the neutral point is closed or opened.

Figure 2:
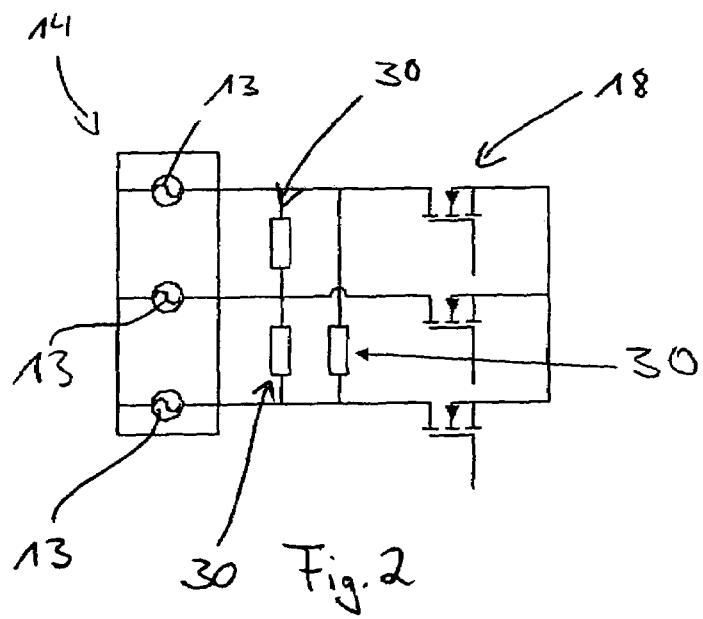
FIG. 2 depicts an alternative embodiment for a segment from FIG. 1.

FIG. 2 depicts the synchronous motor 14 with the neutral point separation 18, three resistors 30 being provided for a relatively high ohmic connection of the motor phases 13 against one another as an alternative to resistors for relatively high-ohmic connection of the motor phases.

Figure 3:
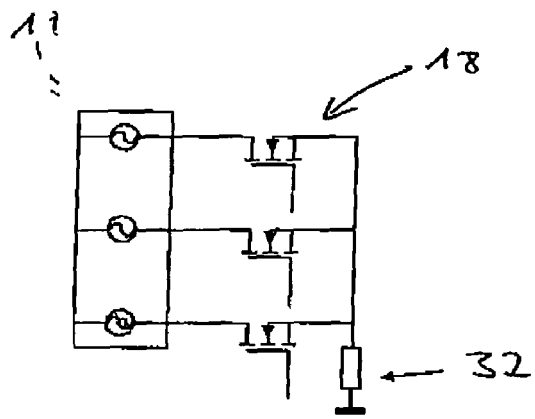
FIG. 3 depicts another alternative to FIG. 2.

FIG. 3 depicts another alternative for resistors for relatively high ohmic connection of the motor phases, one resistor 32 being provided for a relatively high ohmic connection of the motor phases in the neutral point to the ground. However, this only makes sense if the battery voltage is switched for closing the neutral point.

Figure 4:
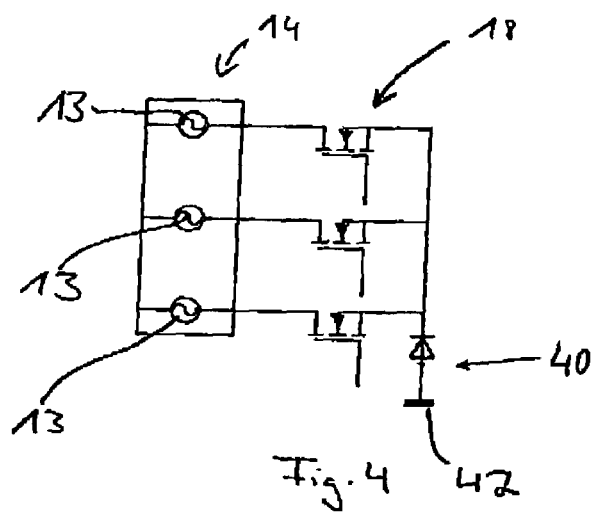
FIG. 4 depicts yet another alternative to FIG. 2.

FIG. 4 again depicts the synchronous motor 14 with the neutral point separation 18, a diode 40 being provided in this embodiment for connecting the motor phases in the neutral point to the ground 42. In this case, as well, this only makes sense if the battery voltage is switched for closing the neutral point.

Figure 5:
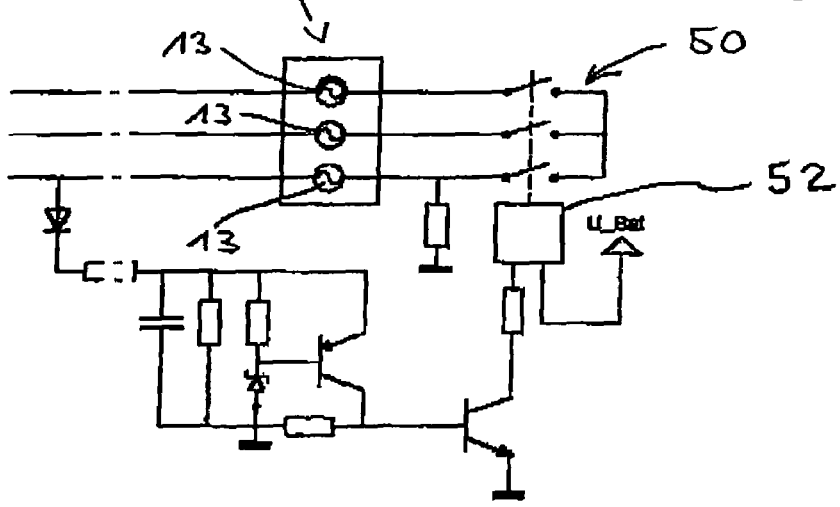
FIG. 5 depicts another alternative to FIG. 2 having an alternative circuit for closing the neutral point using battery voltage.

FIG. 5 depicts how a battery voltage $U_{13}$ Bat is used instead of directly using the smoothed voltage. In addition, relays 50 are provided for the neutral point separation instead of the field effect transistors and controlled by a relay control circuit 52. Alternatively the voltage of only one motor phase can be used.

Figure 6:
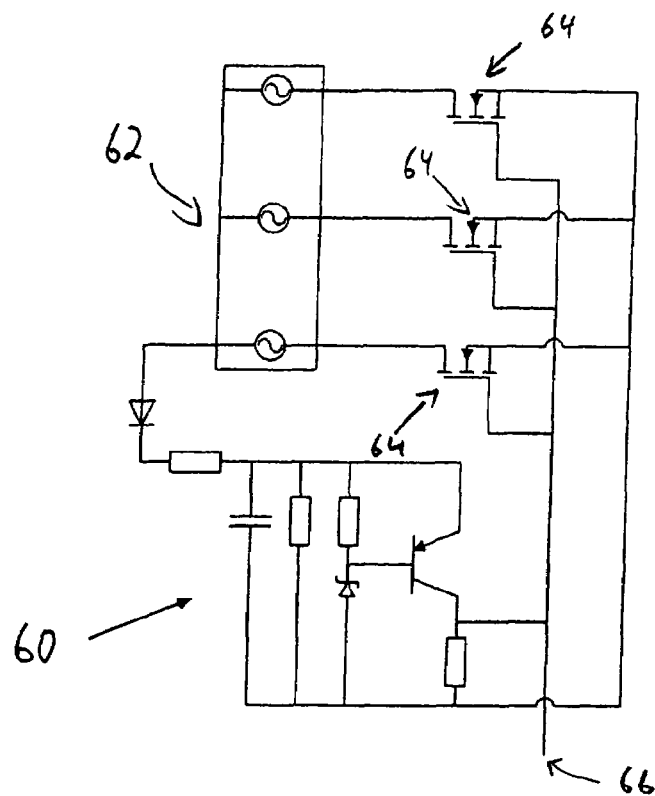
FIG. 6 depicts another alternative to FIG. 2 in which the current path for the generating motor is via the protective circuit.

FIG. 6 depicts a modified embodiment of the protective circuit 16 from FIG. 1, labeled with reference number 60 overall. In this embodiment no additional components are provided in the area of the motor 62 and the neutral point field effect transistors 64. The body diode of the neutral point FETs is used for closing the circuit of the generated motor voltage. This is possible in that the protective circuit 60 is switched between motor output and neutral point.

Only one motor phase is used in the embodiment depicted. Alternatively, the two other phases can also be connected by diode to the circuit 60.

In addition, the terminal 66 for closing and opening the neutral point can be seen in the depiction.

Figure 7:
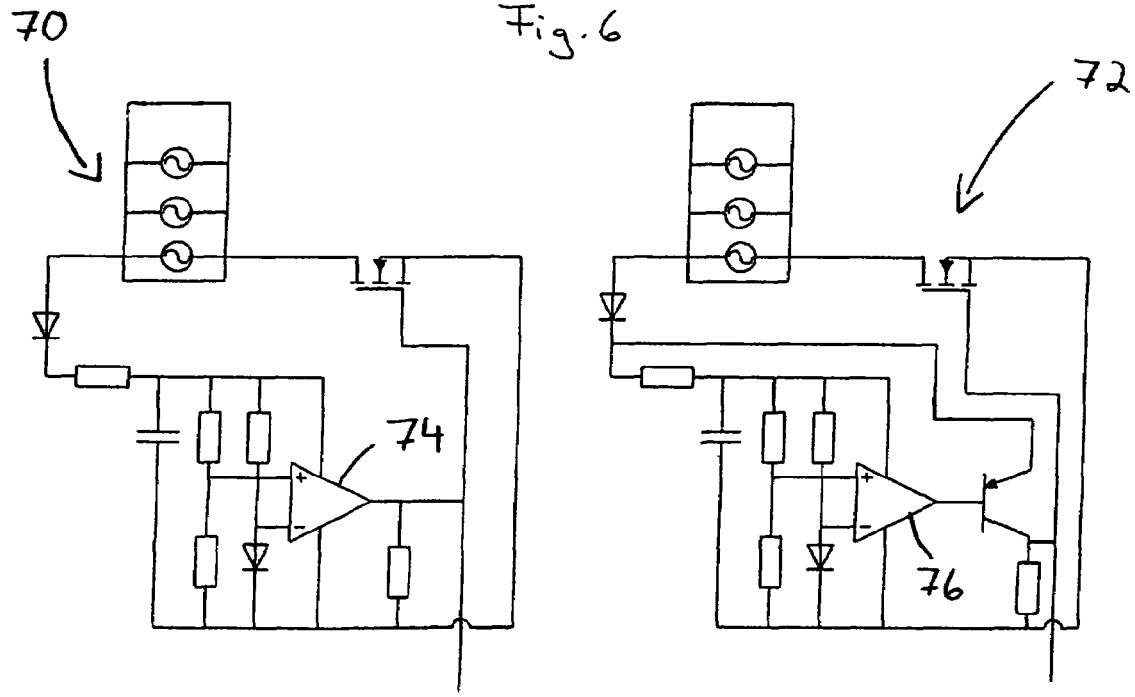
FIG. 7 depicts an alternative to FIG. 6.

FIG. 7 depicts two additional variants 70 and 72 of the protective circuit. As for the protective circuit 60 in FIG. 6, no additional components are provided in the area of the motor or the neutral point FETs in the circuits 70 and 72. The body diode of the neutral point FETs is used for closing the circuit of the generated motor voltage. This is possible because the protective circuits 70 and 72 are each switched between motor output and neutral point.

The protective circuit 70 uses a comparator 74 with a push-pull output. The protective circuit 72 uses a comparator with an open collector output.

Only one motor phase is used in each of the protective circuits 70 and 72. Alternatively, the two other phases can also be connected by diode to the circuit 70 or 72.

The invention claimed is:

1. A power steering system and protective device for a power-assisted steering of a motor vehicle, comprising:
   an AC synchronous electric motor including plural phases each having first and second terminals;
   a power output stage comprised of field effect transistors connected to said first terminals of the plural phases and configured to apply power to said plural phases;
   a neutral point separation circuit connected to the second terminals of the plural phases of the electric motor; and
   the neutral point separation circuit being configured to close the neutral point separation during normal operation of the electric motor, open the neutral point separation when the electric motor is not operated, and close at least a portion of the neutral point separation during periods when a rotational speed of the electric motor exceeds a pre-specified value and power is not applied by the power output stage.

2. The protective device according to claim 1, wherein the neutral point separation circuit is further configured to effect closure of said field effect transistors of the power output stage when said at least a portion of the neutral point separation is closed in response to the rotational speed of the electric motor exceeding said pre-specified value and power is not applied by the power output stage.

3. The protective device according to claim 1, wherein the pre-specified value is selected such that the motor vehicle can still be safely steered even when electronics of the power steering system are turned off.

4. The protective device according to claim 3, wherein the pre-specified value is selected such that a steering wheel is capable of turning at least 90°/s.

5. The protective device according to claim 1, wherein
   the neutral point separation circuit is further configured to include a voltage detection circuit arranged such that a voltage generated by the electric motor is applied to the voltage detection circuit and the voltage detection circuit triggers closure of said at least a portion of the neutral point when the voltage generated exceeds a predetermined value associate with said pre-specified value.

6. The protective device according to claim 5, wherein said generated voltage is smoothed when applied to the voltage detection circuit.

7. The protective circuit according to claim 5, wherein:
   said neutral point separation circuit includes field effect transistors arranged to effect neutral connection of said second terminals of said plural phase; and
   said generated voltage is used for closing said field effect transistors of the neutral point separation circuit when the rotational speed of the electric motor exceeds the pre-specified value and power is not applied by the power output stage.

8. The protective device according to claim 5, wherein said generated voltage is used for switching a second voltage supplied from a battery and used to control closure of said at least a portion of said neutral point separation when the rotational speed of the electric motor exceeds the pre-specified value and power is not applied by the power output stage.

9. The protective device according to claim 1, wherein:
   each of said electric motor and said power output stage includes resistors; and
   the neutral point separation circuit is high ohmic as compared to said resistors of the electric motor and said power output stage.

10. The protective device according to claim, wherein the neutral point separation circuit further includes at least two of said plural phases between the electric motor and the neutral point separation which are short-circuited against one another by resistors when the rotational speed of the electric motor exceeds the pre-specified value and power is not applied by the power output stage.

11. The protective device according to claim 1, wherein the neutral point separation circuit includes field effect transistors having body diodes arranged to effect closure of said at least a portion of the neutral point separation when the rotational speed of the electric motor exceeds the pre-specified value and power is not applied by the power output stage.

12. A method of protecting a power-assisted steering system of a motor vehicle, the power-assisted steering system comprising:
   an AC synchronous electric motor including plural phases each having first and second terminals;
   a power output stage connected to said first terminals of the plural phases and configured to apply power to said plural phases;
   a neutral point separation circuit connected to the second terminals of the plural phases of the electric motor configured to effect neutral point separation of the plural phases when power is not applied to operate the electric motor, the method comprising:
   detecting a rotational speed of the motor;
   determining whether the rotational speed of the motor exceeds a pre-specified value; and
   closing at least a portion of the neutral point separation when a rotational speed of the electric motor exceeds a pre-specified value and power is not applied by the power output stage.

13. A method according to claim 12, wherein said closing at least a portion of the neutral point separation when the electric motor exceeds said pre-specified value and power is not applied by the power output stage includes closing field effect transistors of the neutral point separation circuit to effect a closing of the neutral point separation.

14. A method according to claim 12, further comprising selecting the pre-specified value such that the motor vehicle can still be safely steered even when electronics of the power-assisted steering system are turned off.

15. A method according to claim 14, wherein said selecting includes selecting such that a steering wheel is capable of turning at least 90°/s.

16. A method according to claim 12, the method further comprising:
   applying a voltage generated by the electric motor to the neutral point separation circuit to effect said closing at least a portion of the neutral point separation during periods when the rotational speed of the electric motor exceeds the pre-specified value and power is not applied by the power output stage.

17. A method according to claim 16, further comprising:
   smoothing said generated voltage to a smoothed voltage; and
   using said smoothed voltage as a reference signal for the rotational speed.

18. A method according to claim 16, wherein said neutral point separation circuit includes field effect transistors, said method further comprising using said generated voltage for closing said field effect transistors of the neutral point separation circuit.

19. A method according to claim 16, further comprising using said generated voltage for switching a second voltage applied to effect said closing at least a portion of the neutral point separation during periods when the rotational speed of the electric motor exceeds the pre-specified value and power is not applied by the power output stage.

20. A method according to claim 15, wherein said closing at least a portion of the neutral point separation during periods when the rotational speed of the electric motor exceeds the pre-specified value and power is not applied by the power output stage includes closing all said plural phases.

21. A method according to claim 13, wherein said closing at least a portion of the neutral point separation during periods when the rotational speed of the electric motor exceeds the pre-specified value and power is not applied by the power output stage includes using a body diode of the field effect transistors for closing the neutral point separation.

22. A method according to claim 16, further comprising smoothing said generated voltage to a smoothed voltage; and
using said smoothed voltage for switching a battery voltage to effect said closing at least a portion of the neutral point separation during periods when the rotational speed of the electric motor exceeds the pre-specified value and power is not applied by the power output stage.

23. A power steering system and protective device for a power-assisted steering of a motor vehicle according to claim 1, wherein the at least a portion of the neutral point separation is the neutral point separation of all said plural phases.

* * * * *